(12) United States Patent
Kao et al.

(10) Patent No.: US 8,971,447 B1
(45) Date of Patent: Mar. 3, 2015

(54) VARIABLE DELAY OF DATA SIGNALS

(71) Applicant: Fujitsu Limited, Kawasaki-shi, Kanagawa (JP)

(72) Inventors: Shuo-Chun Kao, Sunnyvale, CA (US); Nikola Nedovic, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/056,069

(22) Filed: Oct. 17, 2013

(51) Int. Cl.
*H04K 1/02* (2006.01)
*H04L 25/03* (2006.01)

(52) U.S. Cl.
CPC .............................. *H04L 25/03261* (2013.01)
USPC ........... 375/297; 375/232; 375/355; 375/230; 708/301; 708/313; 708/300

(58) Field of Classification Search
USPC ................. 375/297, 292, 232, 355, 233, 230; 708/313, 301, 300
See application file for complete search history.

(56) References Cited

U.S. PATENT DOCUMENTS

| 5,751,768 | A | | 5/1998 | Guglielmi et al. | |
|---|---|---|---|---|---|
| 5,917,735 | A | * | 6/1999 | Ko | 708/313 |
| 7,099,907 | B1 | * | 8/2006 | Nakayama | 708/300 |
| 7,659,763 | B2 | * | 2/2010 | Camara et al. | 327/292 |
| 7,868,804 | B2 | | 1/2011 | Khoury et al. | |
| 8,107,520 | B2 | * | 1/2012 | Kawano | 375/230 |
| 8,699,559 | B2 | * | 4/2014 | Erba et al. | 375/233 |
| 8,798,219 | B2 | * | 8/2014 | Buchwald et al. | 375/355 |
| 2002/0023115 | A1 | * | 2/2002 | Kanasugi et al. | 708/313 |
| 2009/0150468 | A1 | * | 6/2009 | Fifield | 708/301 |
| 2009/0245343 | A1 | * | 10/2009 | Iyer et al. | 375/232 |
| 2013/0162901 | A1 | * | 6/2013 | Thompson | 348/441 |

FOREIGN PATENT DOCUMENTS

| EP | 0 729 254 B1 | 12/2002 |
|---|---|---|
| WO | 2007/013037 A1 | 2/2007 |

OTHER PUBLICATIONS

A 10Gb/s 5-DFE/4-Tap-FFE Transceiver in 90nm CMOS Technology Bulzacchelli et al, Journal of Solid State Circuits. vol. 41, No. 12, Dec. 2006.

* cited by examiner

*Primary Examiner* — Eva Puente
(74) *Attorney, Agent, or Firm* — Maschoff Brennan

(57) ABSTRACT

A data signal delay system may include a delay unit and a phase interpolation unit. The delay unit may include multiple delay elements that each have an element delay. The delay unit may be configured to generate multiple delay signals by delaying a data signal using the delay elements such that each of the delay signals has a different delay. The phase interpolation unit may be coupled to the delay unit and may include a mixer. The mixer may be configured to mix two of the delay signals based on mixing weights selected for the two delay signals to generate a final delayed data signal that is the data signal delayed by a final delay. The mixing weights may be selected based on the final delay.

20 Claims, 7 Drawing Sheets

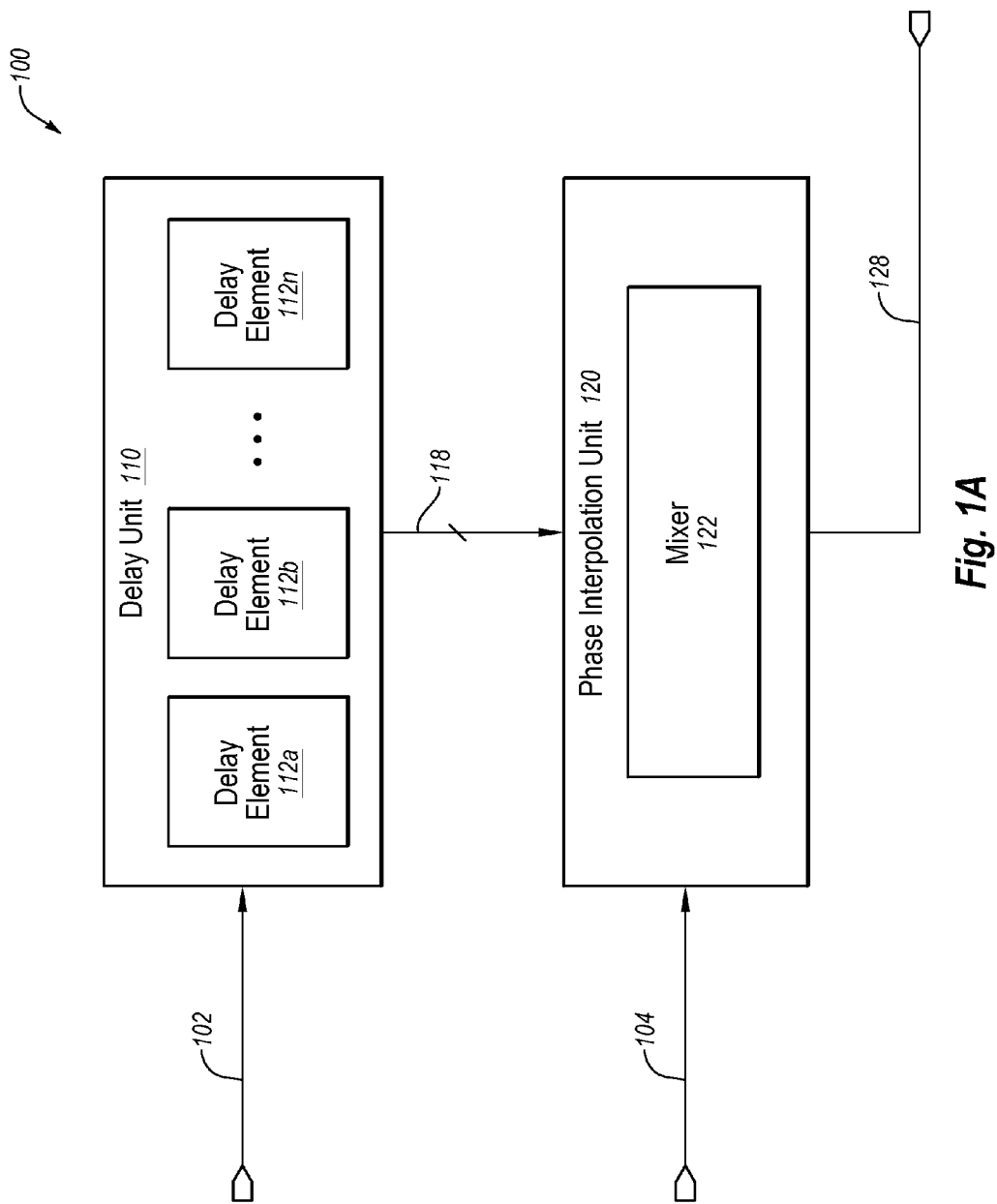

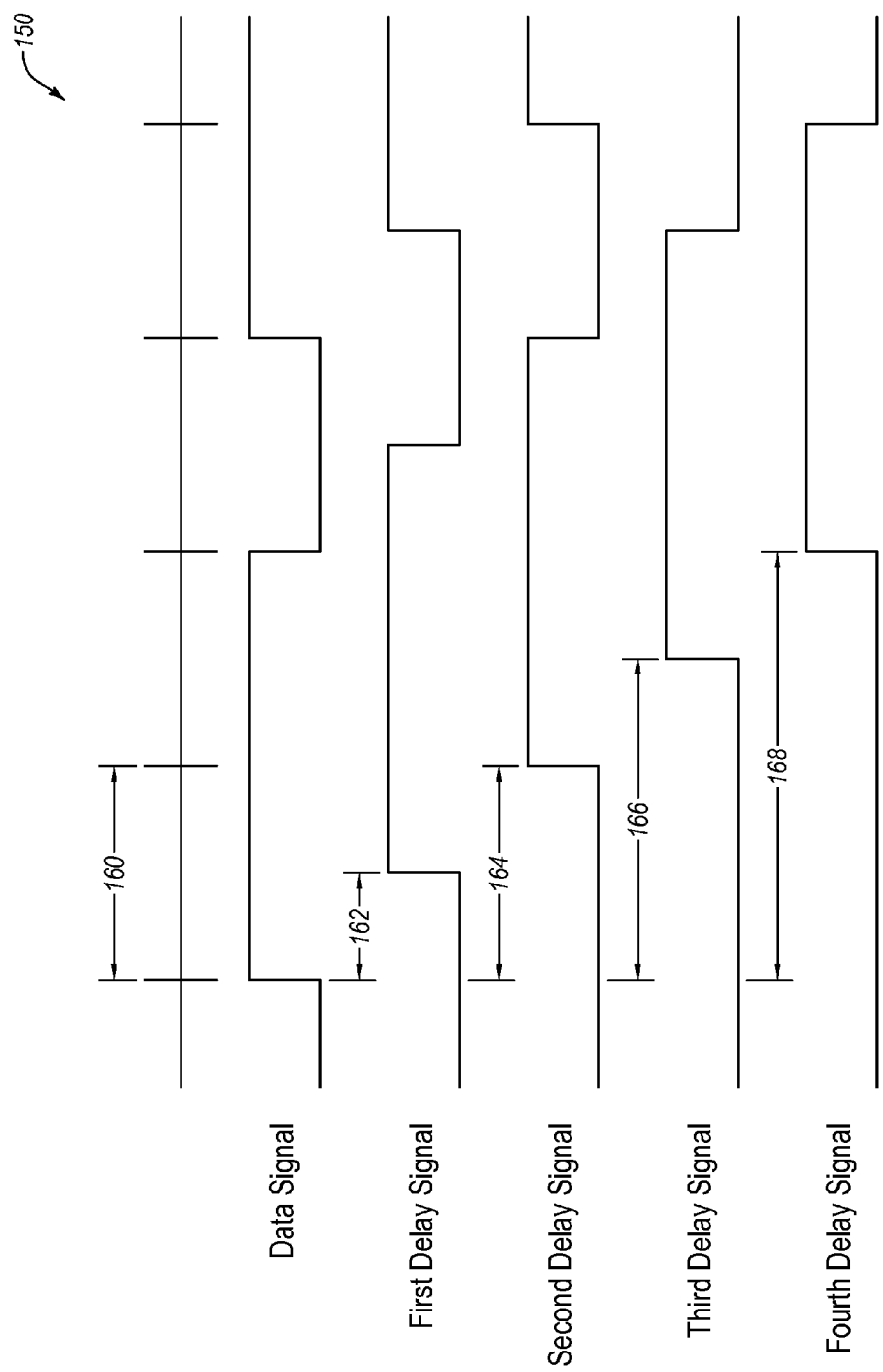

VARIABLE DELAY OF DATA SIGNALS

FIELD

The embodiments discussed herein are related to variable delay of data signals.

BACKGROUND

Signal degradation in the field of digital data transmissions may occur for numerous reasons. For example, the signal may be degraded due to degradation of the channel because of skin effects and dielectric loss. Multiple methods have been proposed to overcome these effects. Some methods include placing equalizers at the transmitters and receivers to help to reduce the signal degradation.

Equalizers in transmitters typically use finite impulse response (FIR) filters to pre-shape transmitted data signals. FIR filters may operate by delaying the transmitted data signals by whole unit-intervals. Only being able to delay a data signal by whole unit-intervals limits the ability of the equalizer to compensate for signal degradations that occur at other times.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a data signal delay system may include a delay unit and a phase interpolation unit. The delay unit may include multiple delay elements that each have an element delay. The delay unit may be configured to generate multiple delay signals by delaying a data signal using the delay elements such that each of the delay signals has a different delay. The phase interpolation unit may be coupled to the delay unit and may include a mixer. The mixer may be configured to mix two of the delay signals based on mixing weights selected for the two delay signals to generate a final delayed data signal that is the data signal delayed by a final delay. The mixing weights may be selected based on the final delay.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A is a block diagram of an example data signal delay system;

FIG. 1B illustrates an example timing diagram for the data signal delay system of FIG. 1A;

DESCRIPTION OF EMBODIMENTS

Figure 2:
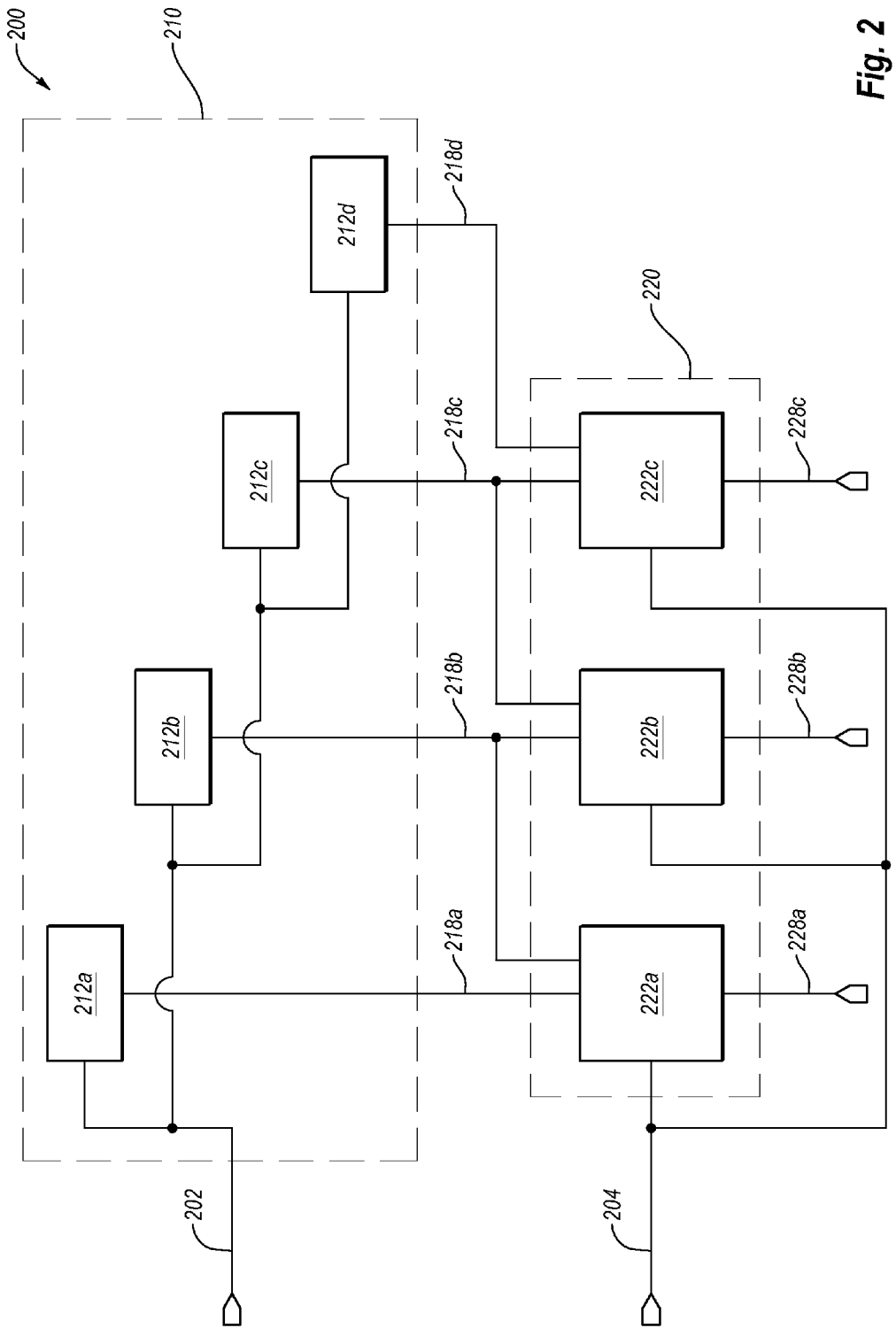
FIG. 2 is a block diagram of another example data signal delay system.

According to an aspect of an embodiment, a data signal delay system is disclosed that may be configured to delay a data signal by a variable delay that is not restricted to delays of whole unit-intervals. The granularity and an amount of delay that may be achieved by the data signal delay system may vary. As an example, the data signal delay system may delay a data signal between 0.5 to 2.0 unit-intervals with a granularity of approximately 0.05 unit-intervals.

The data signal delay system may include a delay unit and a phase interpolation unit. The delay unit may include multiple delay elements and may be configured to receive a data signal. Using the delay elements and the received data signal, the delay unit may be configured to generate multiple delay signals, which are the data signal with different delays. For example, the delay unit may generate four delay signals based on the data signal, one may be the data signal with a 0.5 unit-interval delay, another may be the data signal with a 1.0 unit-interval delay, another may be the data signal with a 1.5 unit-interval delay, and another may be the data signal with a 2.0 unit-interval delay.

The phase interpolation unit may receive the delay signals from the delay unit. Based on a final delay selected for the data signal, the final delay indicating how much delay is desired to introduce to the data signal, the phase interpolation unit may mix two of the delay signals based on mixing weights that are selected based on the final delay. Mixing the two selected delay signals may generate the data signal with the final delay. The data signal with the final delay may be used for multiple applications, such as in an FIR (finite impulse response) equalizer in a data signal transmitter.

Embodiments of the present invention will be explained with reference to the accompanying drawings.

FIG. 1A is a block diagram of an example data signal delay system 100 ("the system 100"), arranged in accordance with at least one embodiment described herein. The system 100 may be configured to delay a data signal 102 by a final delay, where the final delay may not be equivalent to a unit-interval of the data signal 102. The system 100 may include a delay unit 110 and a phase interpolation unit 120. The delay unit 110 may include multiple delay elements 112, illustrated as delay elements 112a, 112b, and 112n. The phase interpolation unit 120 may include a mixer 122.

The delay unit 110 may be configured to receive the data signal 102. The data signal 102 may be a single-ended signal or a differential signal. The data signal 102 may be a signal that is modulated to carry data symbols. In particular, the data signal 102 may be modulated to carry data signals based on a level (for example amplitude) of the data signal 102. A minimum time between condition changes of the data signal 102 that results in a change to a data symbol of the data signal 102 may be referred to as a unit-interval of the data signal 102. For example, assume the data signal 102 alternates between a low level and high level, where the low level represents a logical low value and the high level represents a logical high value. The minimum time between condition changes or transitions of the data signal 102 may be the minimum time that the data signal 102 maintains at a low level so that the data signal 102 may convey a logical low value. For example, if the data signal 102 includes the sequence 101101, the time during which the data signal 102 is a logical low to represent the zero value may be a unit-interval of the data signal 102.

The delay elements 112 of the delay unit 110 may each be configured to delay the data signal 102 by a delay. In some embodiments, each of the delays of the delay elements 112 may be less than the unit-interval of the data signal 102. Alternately or additionally, some of the delays of the delay elements 112 may be more than the unit-interval of the data signal 102. In some embodiments, each of the delays of the delay elements 112 may be different. Alternately or additionally, each of the delays of the delay elements 112 may be the same. Alternately or additionally, some of the delays of the delay elements 112 may be the same and some of the delays of the delay elements 112 may be different.

Using the delay elements 112 and the data signal 102, the delay unit 110 may be configured to generate at least two delay signals 118. Each of the delay signals 118 may be the data signal 102 delayed by some delay. The generated delay signals 118 may have delays such that when the delay signals 118 are ordered from least to greatest based on their delays, a difference between any two adjacent delays is less than the unit-interval of the data signal 102. After generating the delay signals 118, the delay unit 110 may send the delay signals 118 to the phase interpolation unit 120. In some embodiments, the delay unit 110 may be configured to adjust the delay signals 118 before outputting the delay signals 118. For example, in some embodiments, the delay unit 110 may filter, attenuate, or otherwise adjust the delay signals 118.

FIG. 1B illustrates an example timing diagram 150 for the data signal delay system 100 of FIG. 1A, in accordance with at least one embodiment described herein. In particular, the timing diagram 150 illustrates a data signal, a first delay signal, a second delay signal, a third delay signal, and a fourth delay signal. The timing diagram 150 further illustrates a unit-interval 160 of the data signal. The first delay signal is delayed from the data signal by a first delay 162, the second delay signal is delayed from the data signal by a second delay 164, the third delay signal is delayed from the data signal by a third delay 166, and the fourth delay signal is delayed from the data signal by a fourth delay 168. As illustrated in FIG. 1B, the difference between the first and second delays 162 and 164 is less than the unit-interval 160, the difference between the second and third delays 164 and 166 is less than the unit-interval 160, and the difference between the third and fourth delays 166 and 168 is less than the unit-interval 160.

Referring again to FIG. 1A, the phase interpolation unit 120 may be configured to receive the delay signals 118 from the delay unit 110. The phase interpolation unit 120 may be further configured to receive a final delay signal 104 that includes an indication of a final delay for the data signal 102.

In some embodiments, the final delay signal 104 may indicate the final delay for the data signal 102. In these and other embodiments, the phase interpolation unit 120 may be configured to select two of the delay signals 118 for mixing based on the final delay. In particular, the phase interpolation unit 120 may select two of the delay signals 118 that have delays closest to the final delay of the data signal 102, where the difference between the two of the delay signals 118 is less than the unit-interval of the data signal 102. The two delay signals with the closest delays may result in one of the two delay signals having a delay that is larger than the final delay and another of the two delay signals having a delay that is shorter than the final delay. As a result, in some embodiments, such as where the delays between each of the delay signals 118 are each less than the unit-interval of the data signal 102, the phase interpolation unit 120 may be configured to select each of the delay signals 118 to be mixed with at least one other of the delay signals 118 and to select all but the delay signals 118 with the shortest and longest delays to be mixed with at least two others of the delay signals 118.

The phase interpolation unit 120 may also select mixing weights based on the differences between the delays of the two selected delay signals and the final delay. In particular, the mixing weights may be selected so that when the two selected delay signals are mixed, the result is the data signal 102 with the final delay. For example, the selected delay signal with a delay that is closer to the final delay may be weighted more than the selected delay signal with a delay that is farther from the final delay. In some embodiments, the mixing weights may vary between 0.0 and 1.0 and the combination of the mixing weights may be 1.0. Alternately or additionally, the combination of the mixing weights may be more or less than 1.0.

An example follows: Assume that a first delay signal is delayed by 1.5 unit-intervals and a second delay signal is delayed by 2.0 unit-intervals, and the final delay is 1.7 unit-intervals. The mixing weight for the first delay signal may be 0.6 and the mixing weight for the second delay signal may be 0.4. As another example, assume that a first delay signal is delayed by 1.5 unit-intervals and a second delay signal is delayed by 2.0 unit-intervals, and the final delay is 1.5 unit-intervals. The mixing weight for the first delay signal may be 1.0 and the mixing weight for the second delay signal may be 0.

Alternately or additionally, the final delay signal 104 may indicate which of the delay signals 118 to select for mixing and the mixing weights for each of the selected delay signals 118. Alternately or additionally, the final delay signal 104 may indicate only the delay signals 118 to select for mixing and the final delay or just the mixing weights and the final delay. In these and other embodiments, the phase interpolation unit 120 may determine either the mixing weights or the delay signals 118 for mixing.

The phase interpolation unit 120 may send the mixing weights and the two selected delay signals to the mixer 122. The mixer 122 may mix the two selected delay signals based on the mixing weights to generate a final delayed data signal 128 that is output by the phase interpolation unit 120. The final delay of the final delayed data signal 128 that is output by the phase interpolation unit 120 may be bounded by the delays of the two selected delays signals that are mixed by the mixer 122. For example, when the delay of one of the selected delay signal is 1.0 unit-interval and another of the selected delay signal is 1.7 unit-intervals, the final delay of the final delayed data signal 128 is bounded between 1.0 unit-interval and 1.7 unit-intervals. As a result, the final delay of the final delayed data signal 128 may be 1.0, 1.7, or some value there between.

In some embodiments, the phase interpolation unit 120 may be configured to perform one or more additional adjustments to the final delayed data signal 128 before outputting the final delayed data signal 128. For example, in some embodiments, the phase interpolation unit 120 may filter, amplify, or otherwise adjust the final delayed data signal 128.

The system 100 may be configured to generate any final delay for the data signal 102 by adjusting the data signal delay system 100. For example, delaying the data signal 102 anywhere between one unit-interval and five unit-intervals may use more delay elements 112 and delay signals 118 than delaying the data signal 102 anywhere between four unit-intervals and six unit-intervals. Furthermore, the granularity of the final delays of the data signal 102 may depend on the granularity of the mixing weights that may be applied by the mixer 122.

The system 100 may provide various advantages over some other data delay systems. Other delay systems typically delay data signals by one unit-interval increments and/or incorporate delay elements whose delay vary with voltage variations, temperature, and processes. The system 100 provides for variable delay of the data signal 102 that is bounded between two selected delays signals and that is less dependent on temperature, process, and voltage variations as the mixing weights may be adjusted based on temperature, voltage variations, and processes to account for variations in the system 100.

Furthermore, the system 100 may be configured to delay other signals, such as clock signals. Many other systems that may be configured to delay clock signals may not function to delay data signals. Clock signals typically have constant rising and falling edges that may be used to interpolate a delay for a clock signal. Data signals, however, do not typically have constant rising and falling edges. Rather, the edges of a data signal depend on a change in the condition of the data signal, such as from a low value to a high value. Data signals may have multiple low values and then multiple high values or bursts of alternating high and low values. Known systems that merely interpolate between edges of a constant clock signal may not be able to interpolate between edges of a data signal to properly delay the data signal. Furthermore, some known systems that delay clock signals may, when attempting to delay a data signal, just delay one edge of one symbol of the data signal relative to other edges instead of the entire data signal. When delaying clock signals, delaying one edge relative to other edges may change the relative phase of the clock signal and result in an adequate delay of the clock signal. When delaying a data signal, however, delaying one edge relative to other edges may result in a delayed data signal losing information or conveying inaccurate information instead of a delayed version of the data signal. The system 100 may be configured to delay the data signal 102 without encountering these and other issues by delaying each of the edges of the data signal 102 for the final delay of the data signal 102.

Modifications, additions, or omissions may be made to the system 100 without departing from the scope of the present disclosure. For example, in some embodiments, the phase interpolation unit 120 may include multiple mixers, where each of the mixers may be configured to mix two of the delay signals 118.

FIG. 2 is a block diagram of another example data signal delay system 200 ("the system 200"), arranged in accordance with at least one embodiment described herein. The system 200 may be configured to delay a data signal 202 by a final delay, where the final delay may not be equivalent to a unit-interval of the data signal 202. The system 200 may include a delay unit 210 and a phase interpolation unit 220. The delay unit 210 may include first, second, third, and fourth delay elements 212a, 212b, 212c, and 212d, referred to herein collectively as the delay elements 212. The phase interpolation unit 220 may include first, second, and third mixers 222a, 222b, and 222c, referred to herein collectively as the mixers 222.

The delay unit 210 may be configured to receive the data signal 202. The data signal 202 may be a single-ended signal or a differential signal. Each of the delay elements 212 may be configured to delay the data signal 202 by a delay. The delay of each of the delay elements 212 may be different. The first delay element 212a may be configured to delay the data signal 202 by a first amount to generate a first delay signal 218a. The second delay element 212b may be configured to delay the data signal 202 by a second amount to generate a second delay signal 218b. The third delay element 212c may be configured to delay the data signal 202 by a third amount to generate a third delay signal 218c. The fourth delay element 212d may be configured to delay the data signal 202 by a fourth amount to generate a fourth delay signal 218d. Collectively the first, second, third, and fourth delay signals 218a, 218b, 218c, and 218d may be referred to herein as the delay signals 218.

The amounts of delay by the delay elements 212, when ordered from smallest to largest, may be the first amount, the second amount, the third amount, and the fourth amount. The difference between the first amount and the second amount may be less than the unit-interval of the data signal 202. Similarly, the difference between the second amount and the third amount and the difference between the third amount and the fourth amount may be less than the unit-interval of the data signal 202. In some embodiments, the difference between the first amount and the third and fourth amounts and the difference between the second amount and the fourth amount may be more than the unit-interval of the data signal 202.

The first delay element 212a may be configured to send the first delay signal 218a to the first mixer 222a. The second delay element 212b may be configured to send the second delay signal 218b to the first mixer 222a and the second mixer 222b. The third delay element 212c may be configured to send the third delay signal 218c to the second mixer 222b and the third mixer 222c. The fourth delay element 212d may be configured to send the fourth delay signal 218d to the third mixer 222c. As a result, each of the mixers 222 may receive two of the delay signals 218.

Each of the mixers 222 may be configured to mix two of the delays signals 218 based on a mixing weight signal 204. The mixing weight signal 204 may be generated based on the final delay for the data signal 202 and the amounts of the delay by each of the delay elements 212. In some embodiments, the amounts of the delay by each of the delay elements 212 may be the same. In these and other embodiments, the mixing weight signal 204 may be the same for each of the mixers 222. Alternately or additionally, the amounts of the delay by each of the delay elements 212 may be different. In these and other embodiments, the mixing weight signal 204 may be different for each of the mixers 222.

Based on the mixing weight signal 204, each of the mixers 222 may generate an output delay signal 228. The first mixer 222a may be configured to generate a first output delay signal 228a. The second mixer 222b may be configured to generate a second output delay signal 228b. The third mixer 222c may be configured to generate a third output delay signal 228c. One of the output delay signals 228 may be selected as a final delay signal that is the data signal 202 delayed by the final delay. In some embodiments, the one of the output delay signals 228 selected as the final delay signal may be selected by the phase interpolation unit 220, by another component of the system 200, or by a component outside the system 200 that receives the output delay signals 228. The one of the output delay signals 228 selected as the final delay signal may be based on the final delay for the data signal 202.

In some embodiments, one of the mixers 222 may be enabled after a final delay is selected and the other two of the mixers 222 may be disabled. In particular, the mixers 222 that may be configured to receive the delay signals 218 that are closest to the final delay may be enabled. For example, assume that the final delay is 1.7 unit-intervals and the first, second, third, and fourth delay signals 218 have unit-interval delays of 0.5, 1.0, 1.5, and 2.0, respectively. Accordingly, the mixer 222 that receives the third and fourth delay signals 218c and 218d, which is the third mixer 222c, may be enabled. The third mixer 222c may receive the mixing weight signal 204 such that the third mixer 222c outputs the third output delay signal 228c, which is the data signal 202 delayed by the final delay of 1.7 unit-intervals. As a result, in these and other embodiments, the third output delay signal 228c may be the final delay signal output by the system 200.

Modifications, additions, or omissions may be made to the system 200 without departing from the scope of the present disclosure.

Figure 3:
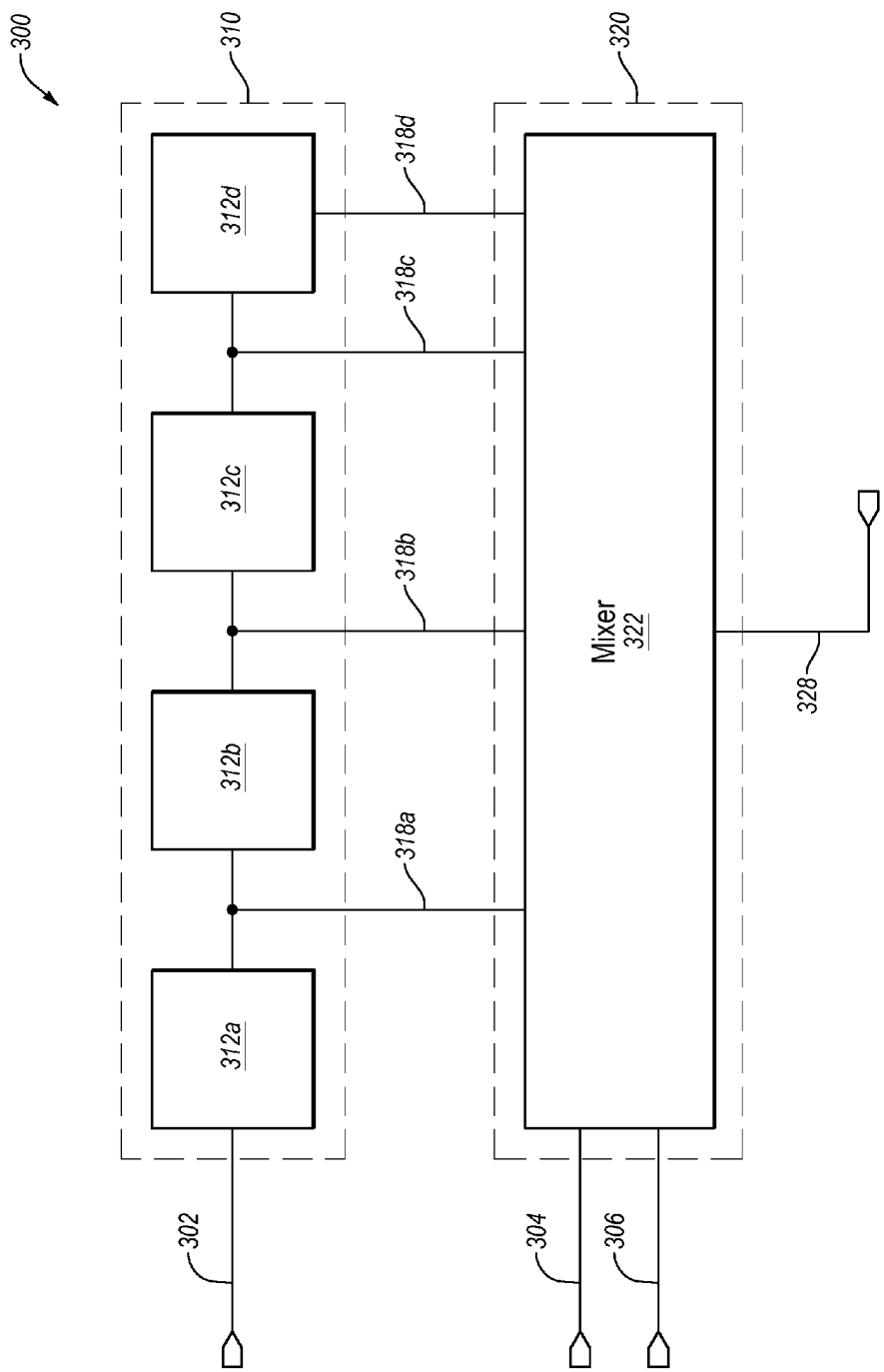
FIG. 3 is a block diagram of another example data signal delay system.

FIG. 3 is a block diagram of another example data signal delay system 300 ("the system 300"), arranged in accordance with at least one embodiment described herein. The system 300 may be configured to delay a data signal 302 by a final delay, where the final delay may not be equivalent to a unit-interval of the data signal 302, to generate a final delayed data signal 328. The system 300 may include a delay unit 310 and a phase interpolation unit 320. The delay unit 310 may include first, second, third, and fourth delay elements 312a, 312b, 312c, and 312d referred to herein collectively as the delay elements 312. The phase interpolation unit 220 may include a mixer 322.

The delay unit 310 may be configured to receive the data signal 302. The data signal 302 may be a single-ended signal or a differential signal. The delay unit 310 may be configured to generate first, second, third, and fourth delay signals 318a, 318b, 318c, and 318d, referred to herein collectively as the delay signals 318, using the delay elements 312, where each delay signal 318 is the data signal 302 delayed by a different amount.

As illustrated in FIG. 3, the delay elements 312 may be arranged sequentially such that an output of each of the delay elements 312 is one of the delay signals 318 and an output of each of the delay elements 312 except the fourth delay element 312d is provided as an input to another of the delay elements 312.

For example, the first delay element 312a may be configured to delay the data signal 302 by a first amount to generate the first delay signal 318a and to send the first delay signal 318a to the second delay element 312b. The second delay element 312b may be configured to delay the first delay signal 318a by a second amount to generate the second delay signal 318b and to send the second delay signal 318b to the third delay element 312c. The third delay element 312c may be configured to delay the second delay signal 318b by a third amount to generate the third delay signal 318c and to send the third delay signal 318c to the fourth delay element 312d. The fourth delay element 312d may be configured to delay the third delay signal 318c by a fourth amount to generate the fourth delay signal 318d. Each of the delay signals 318 may be sent to the phase interpolation unit 320.

In some embodiments, the delay of each of the delay elements 312 may be different, the same, or some may be the same and some may be different. In some embodiments, each of the delays of the delay elements 312 may be less than a unit-interval delay of the data signal 302. Alternately or additionally, some of the delays of the delay elements 312 may be more than a unit-interval of the data signal 302 and some of the delays of the delay elements 312 may be less than the unit-interval of the data signal 302. When some of the delays of the delay elements 312 are more than the unit-interval of the data signal 302, the delay signals 318 with a difference in their delays that is less than the unit-interval of the data signal 302 may be mixed by the mixer 322.

For example, the first delay element 312a and the third delay element 312c may have delays that are more than the unit-interval of the data signal 302, while the second and fourth delay elements 312b and 312d may have delays that are less than the unit-interval of the data signal 302. In these and other embodiments, the first delay signal 318a and the second delay signal 318b may be mixed by the mixer 322 because a delay difference between the first delay signal 318a and the second delay signal 318b may be less than the unit-interval of the data signal 302. Likewise, the third delay signal 318c and the fourth delay signal 318d may be mixed by the mixer 322 because a delay difference between the third delay signal 318c and the fourth delay signal 318d may be less than the unit-interval of the data signal 302. However, a delay difference between the second delay signal 318b and the third delay signal 318c may be larger than the unit-interval of the data signal 302. As a result, the second delay signal 318b and the third delay signal 318c may not be mixed by the mixer 322 to generate the final delayed data signal 328.

The phase interpolation unit 320 may be configured to receive the delay signals 318 from the delay unit 310. In particular, the mixer 322 may be configured to receive the delay signals 318. The mixer 322 may be configured to mix each of the delay signals 318 with at least one other of the delay signals 318. In some embodiments, the mixer 322 may be configured to mix multiple of the delay signals 318 with at least two other of the delay signals 318. The number of delay signals 318 that may be mixed by the mixer 322 with two of the other delay signals 318 may depend on the delays of the delay elements 312 as discussed above. When each of the delay elements 312 except the first delay element 312a has a delay that is less than the unit-interval of the data signal 302, then all but two of the delay signals 318 may be mixed with two of the other delay signals 318.

The mixer 322 may be configured to select the delay signals 318 for mixing based on a select delay signal 304. The select delay signal 304 may indicate which of the delay signals 318 to mix based on the final delay and the delays of the delay elements 312. The mixer 322 may mix the selected delay signals 318 based on mixing weights provided by a mixing weights signal 306. The mixing weights signal 306 may be based on the final delay of the data signal 302 and the selected delay signals 318. The mixer 322 may output the final delayed data signal 328 after mixing the selected delay signals 318 based on the mixing weights signal 306. Modifications, additions, or omissions may be made to the system 300 without departing from the scope of the present disclosure.

Figure 4:
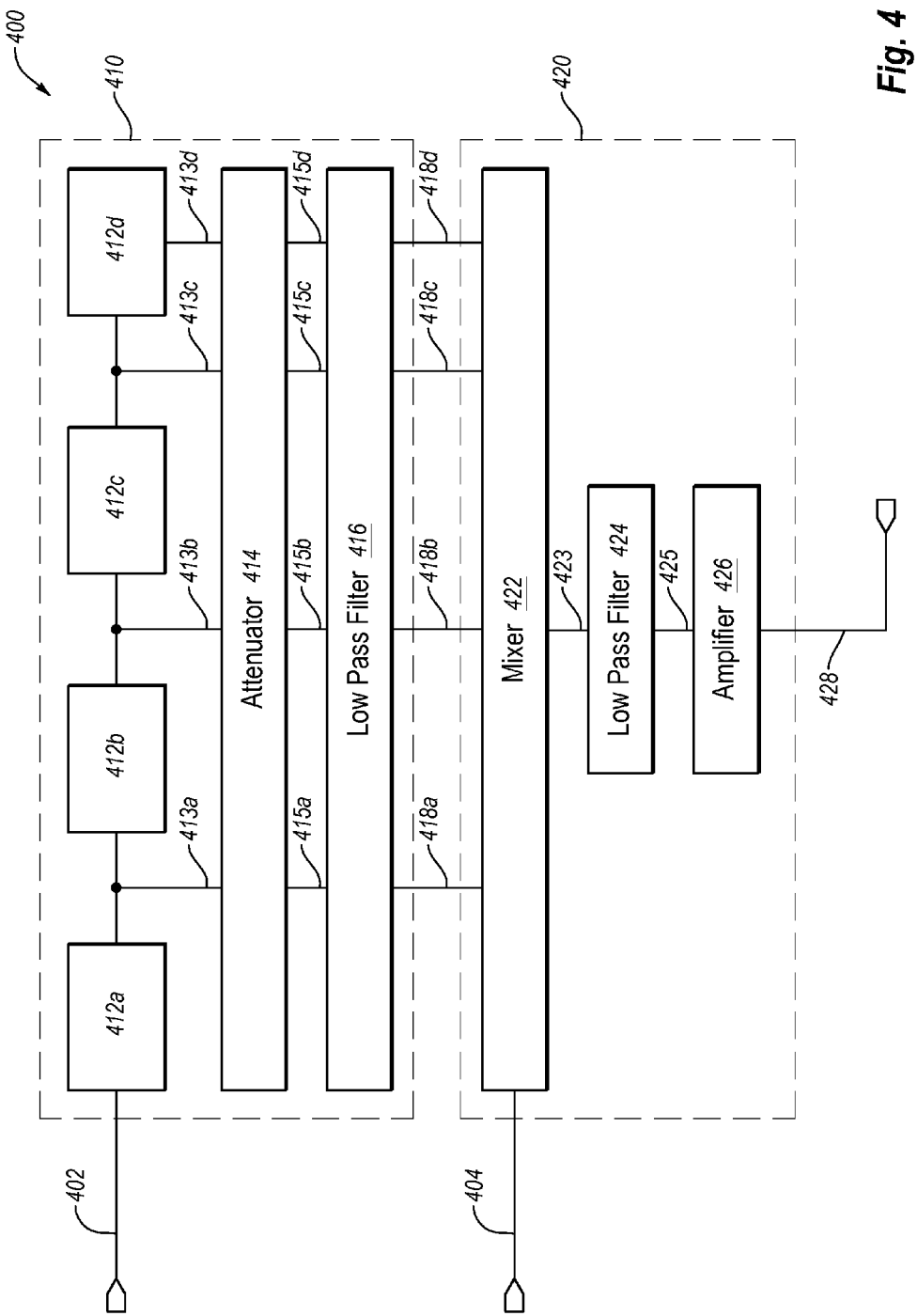
FIG. 4 is a block diagram of another example data signal delay system.

FIG. 4 is a block diagram of another example data signal delay system 400 ("the system 400"), arranged in accordance with at least one embodiment described herein. The system 400 may be configured to delay a data signal 402 by a final delay, where the final delay may not be equivalent to a unit-interval of the data signal 402, to generate a final delayed data signal 428. The system 400 may include a delay unit 410 and a phase interpolation unit 420. The phase interpolation unit 420 may include a mixer 422, a low pass filter 424, and an amplifier 426.

The delay unit 410 may include first, second, third, and fourth delay elements 412a, 412b, 412c, and 412d, referred to collectively as the delay elements 412. The delay elements 412 may be configured to generate first, second, third, and fourth delay signals 413a, 413b, 413c, and 413d, referred to herein collectively as the delay signals 413. The delay elements 412 and the delay signals 413 may be analogous to the delay elements 312 and the delay signals 318 of FIG. 3. As a result, no further description is provided with respect to FIG. 4. The delay unit 410 may further include an attenuator 414 and a low pass filter 416.

The attenuator 414 may be configured to receive the delay signals 413 from the delay elements 412. The attenuator 414 may be configured to attenuate the amplitude of the delay signals 413 to generate first, second, third, and fourth attenuated delay signals 415a, 415b, 415c, and 415d, referred to herein collectively as the attenuated delay signals 415. The attenuated delay signals 415 may have a reduced swing between a low level and a high level. The attenuator 414 may send the attenuated delay signals 415 to the low pass filter 416.

The low pass filter 416 may be configured to receive the attenuated delay signals 415 and to low pass filter the attenuated delay signals 415 to generate first, second, third, and fourth filtered attenuated delay signals 418a, 418b, 418c, and 418d, referred to herein collectively as the filtered attenuated delay signals 418. The low pass filter 416 may send the filtered attenuated delay signals 418 to the phase interpolation unit 420, and in particular, the mixer 422.

The mixer 422 may be configured to receive the filtered attenuated delay signals 418 and a final delay signal 404. Based on the final delay signal 404, the mixer 422 may be configured to mix two of the filtered attenuated delay signals 418 to generate a delayed data signal 423. Receiving the filtered attenuated delay signals 418 may assist the mixer 422 in mixing the filtered attenuated delay signals 418. In particular, the delayed data signal 423 may be better formed by the mixer 422 when the mixer 422 mixes the filtered attenuated delay signals 418 instead of mixing the delay signals 413 from the delay elements 412. For example, the mixer 422, receiving sharp or very fast-edged signals, may result in the mixer 422 losing phase information of the signal. To avoid the loss of phase information of a signal, the delay signals 413 provided to the mixer 422 may be attenuated and low pass filtered before being sent to the mixer 422 as described herein. The delayed data signal 423 may be provided to the low pass filter 424.

The low pass filter 424 may be configured to receive and to low pass filter the delayed data signal 423 to generate a filtered delayed data signal 425. Filtering the delayed data signal 423 may reduce deformation of the delayed data signal 423. The filtered delayed data signal 425 may be sent to the amplifier 426. The amplifier 426 may be configured to receive the filtered delayed data signal 425 and to amplify the filtered delayed data signal 425 to generate the final delayed data signal 428.

Modifications, additions, or omissions may be made to the system 400 without departing from the scope of the present disclosure. For example, in some embodiments, the system 400 may not include one or more of the attenuator 414, the low pass filter 416, the low pass filter 424, and the amplifier 426.

Figure 5:
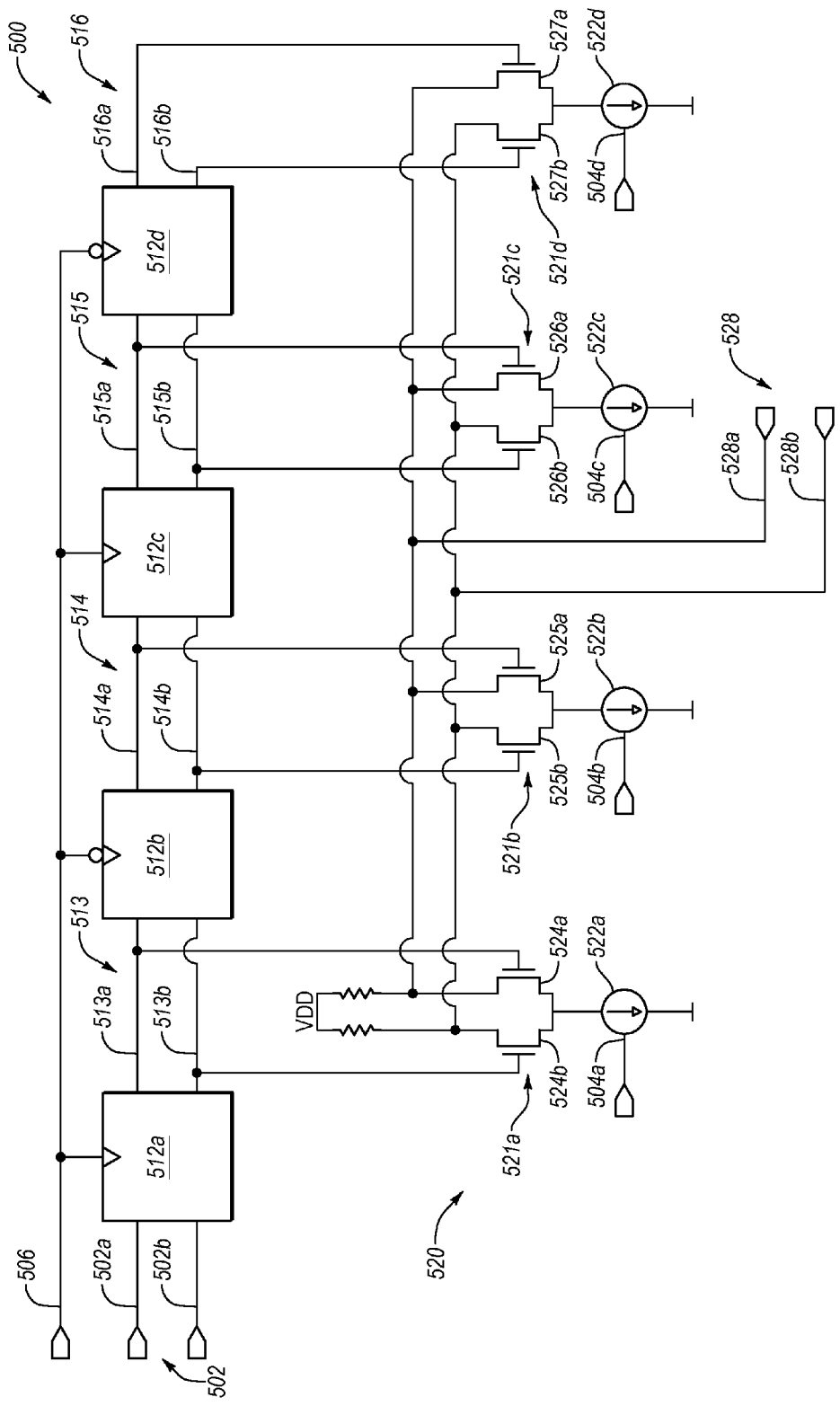
FIG. 5 is a block diagram of another example data signal delay system.

FIG. 5 is a block diagram of another example data signal delay system 500 ("the system 500"), arranged in accordance with at least one embodiment described herein. The system 500 may be configured to delay a differential data signal 502, which includes data signal_A 502a and data signal_B 502b, where the final delay may not be equivalent to a unit-interval of the data signal 502, to generate a differential final delayed data signal 528, which includes final delayed data signal_A 528a and final delayed data signal_B 528b.

The system 500 may include first, second, third, and fourth delay elements 512a, 512b, 512c, and 512d, referred to herein collectively as the delay elements 512.

The delay elements 512 may be arranged sequentially such that an output of each of the delay elements 512 except the fourth delay element 512d is provided as an input to another of the delay elements 512. In particular, the delay elements 512 may be configured as latches that latch data based on a rising edge of a clock signal 506 with an approximate 50 percent duty cycle. In these and other embodiments, the first delay element 512a may latch the data signal 502 on a rising edge of the clock signal 506 and may output a first delay signal 513, which includes first delay data signal_A 513a and first delay data signal_B 513b.

The second delay element 512b may receive the first delay signal 513. The second delay element 512b also receives an inversion of the clock signal 506. As a result, the second delay element 512b may latch the first delay signal 513 on a falling edge of the clock signal 506 and may output a second delay signal 514, which includes second delayed data signal_A 514a and second delayed data signal_B 514b.

The third delay element 512c may receive the second delay signal 514. The third delay element 512c also receives the clock signal 506. As a result, the third delay element 512c may latch the second delay signal 514 on a rising edge of the clock signal 506 and may output a third delay signal 515, which includes a third delay data signal_A 515a and a third delay data signal_B 515b.

The fourth delay element 512d may receive the third delay signal 515. The fourth delay element 512d also receives an inversion of the clock signal 506. As a result, the fourth delay element 512d may latch the third delay signal 515 on a falling edge of the clock signal 506 and may output a fourth delay signal 516, which includes a fourth delay data signal_A 516a and a fourth delay data signal_B 516b.

The clock signal 506 may have a similar frequency as a clock signal used to clock the data signal 502. As a result, the time between rising edges of the clock signal may be a unit-interval of the data signal 502 Thus, each of the delay elements 512 may impart a delay of 0.5 of a unit-interval. Therefore, a delay difference between the first and second delay signals 513 and 514 may be 0.5 of a unit-interval, the delay difference between the second and third delay signals 514 and 515 may be 0.5 of a unit-interval, and the delay difference between the third and fourth delay signals 515 and 516 may be 0.5 of a unit-interval. For example, assuming that the delay of the first delay signal 513 is 0.5 unit-intervals, the delays of the second, third, and fourth delay signals 513-515 relative to the data signal 502 may be 1.0, 1.5, and 2.0 unit-intervals, respectively.

The delay between the data signal 502 and the first delay signal 513 may vary depending on when level changes occur in the data signal 502 relative to the rising edge of the clock signal 506. At a minimum, the delay between the data signal 502 and the first delay signal 513 may be a set-up time of the first delay element 512a to capture the data signal 502.

The system 500 may also include a phase interpolation unit 520 that may be configured to mix two of the delay signals 513-516. The phase interpolation unit 520 may include first, second, third, and fourth units 521a, 521b, 521c, and 521d, referred to herein collectively as the units 521 that may be configured as a mixer. The first unit 521a may include transistors 524a and 524b and a current source 522a. The gates of the transistors 524a and 524b may be coupled to the first delayed data signal_A and signal_B 513a and 513b, respectively. The sources of the transistors 524a and 524b may be coupled to the current source 522a. The drains of the transistors 524a and 524b may be coupled to a voltage (illustrated as VDD in FIG. 5) through one or more active and/or passive devices, such as resistors, inductors, or other active or passive devices. The drains of the transistors 524a and 524b may also be coupled to the final delayed data signal_A 528a and final delayed data signal_B 528b, respectively. The current source 522a may be coupled to a weight signal 504a.

The second unit 521b may include transistors 525a and 525b and a current source 522b. The gates of the transistors 525a and 525b may be coupled to the second delayed data signal_A and signal_B 514a and 514b, respectively. The sources of the transistors 525a and 525b may be coupled to the current source 522b. The drains of the transistors 525a and 525b may be coupled to the voltage (VDD) through the one or more active and/or passive devices. The drains of the transistors 525a and 525b may also be coupled to the final delayed data signal_A 528a and final delayed data signal_B 528b, respectively. The current source 522b may be coupled to a weight signal 504b.

The third unit 521c may include transistors 526a and 526b and a current source 522c. The gates of the transistors 526a and 526b may be coupled to the third delayed data signal_A and signal_B 515a and 515b, respectively. The sources of the transistors 526a and 526b may be coupled to the current source 522c. The drains of the transistors 526a and 526b may be coupled to the voltage (VDD) through the one or more active and/or passive devices. The drains of the transistors 526a and 526b may also be coupled to the final delayed data signal_A 528a and final delayed data signal_B 528b, respectively. The current source 522c may be coupled to a weight signal 504c.

The fourth unit 521d may include transistors 527a and 527b and a current source 522d. The gates of the transistors 527a and 527b may be coupled to the fourth delayed data signal_A and signal_B 516a and 516b, respectively. The sources of the transistors 527a and 527b may be coupled to the current source 522d. The drains of the transistors 527a and 527b may be coupled to the voltage (VDD) through the one or more active and/or passive devices. The drains of the transistors 527a and 527b may also be coupled to the final delayed data signal_A 528a and final delayed data signal_B 528b, respectively. The current source 522d may be coupled to a weight signal 504d.

The first unit 521a operates as follows: The weighting signal 504a may enable the current source 522a to allow the current source 522a to sink current from the voltage (VDD). An amount of current sunk by the current source 522a may depend on a value of the weighting signal 504a. When the first delayed data signal_A and signal_B 513a and 513b are provided to the gates of the transistors 524a and 524b, the first unit 521a provides a signal on the drains of the transistors 524a and 524b that depends on the first delayed data signal_A and signal_B 513a and 513b and the weighting signal 504a. In particular, when the current source 522a sinks current from the voltage (VDD), the transistors 524a and 524b amplify the first delayed data signal_A and signal_B 513a and 513b based on the amount of current sunk by the current source 522a and provided the amplified first delayed data signal_A and signal_B 513a and 513b as the signal on the drains of the transistors 524a and 524b. The amplification of the first delayed data signal_A and signal_B 513a and 513b may be greater than or less than one. When no other unit 521 is enabled, the signal provided at the drains of the transistors 524a and 524b is the final delayed data signal_A 528a and final delayed data signal_B 528b. The other units 521 operate in a manner analogous to the operation of the first unit 521a and no further description is provided herein.

To mix two of the delay signals 513-516, two of the units 521 are enabled at the same time. Each of the two units 521 provides a signal at the drains of the transistors of the respective two units 521. The signals at the drains mix together to form the final delayed data signal_A 528a and the final delayed data signal_B 528b. An amount that each unit 521 contributes to the final delayed data signal_A 528a and final delayed data signal_B 528b may depend on a value of the weighting signal 504 provided to the two enabled units 521.

For example, to mix the first and second delay signals 513 and 514, the first and second units 521a and 521b may be supplied with weighting signals 504a and 504b, respectively, to enable the respective current sources 522a and 522b. The first unit 521a may provide a signal based on the first delay signal 513 and the weighting signal 504a and the second unit 521b may provide a signal based on the second delay signal 514 and the weighting signal 504b. The final delayed data signal 528 may be a result of the mixing of the signals provided by the first and second units 521a and 521b. The final delay of the final delayed data signal 528 may be bound by the delays of the first and second delay signals 513 and 514 and related to the weighting signals 504a and 504b provided to the first and second units 521a and 521b. For example, when the weight signal 504a is larger than the weight signal 504b, the first unit 521a may amplify the first delay signal 513 more than the second unit 521b amplifies the second delay signal 514. As a result of the larger amplification applied by the first unit 521a, the final delayed data signal 528 may have a delay closer to the delay of the first delay signal 513 than the second delay signal 514.

In the illustrated embodiment, the first and second units 521a and 521b may be enabled at the same time, the second and third units 521b and 521c may be enabled at the same time, and the third and fourth units 521c and 521d may be enabled at the same time to provide a continuum of final delays for the final delayed data signal 528 that is bounded between the delay of the first delay signal 513 and the fourth delay signal 516.

Modifications, additions, or omissions may be made to the system 500 without departing from the scope of the present disclosure. For example, in some embodiments, the system may include more delay elements 512. Alternately or additionally, each of the delay elements 512 may not output a delay signal. In these and other embodiments, the final delay of the final delayed data signal 528 may not have a continuous delay but a disjointed delay between a first and last data signal, depending on the delay of the delay element that does not output a delay signal.

Figure 6:
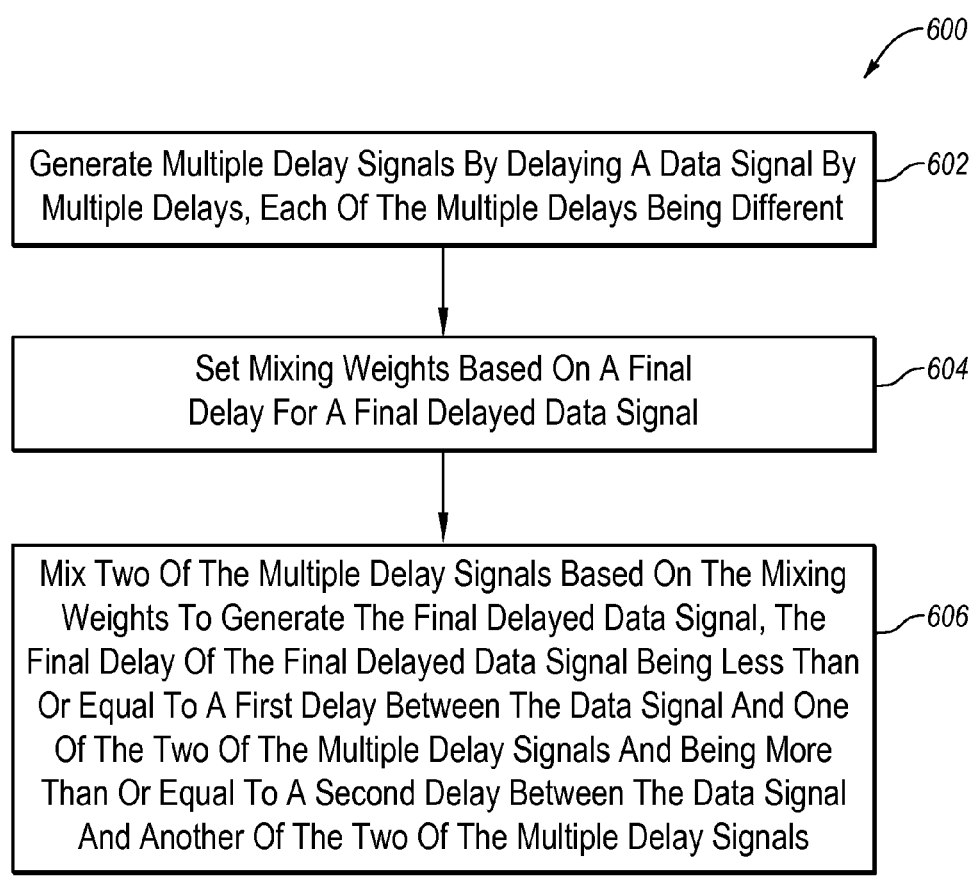
FIG. 6 is a flowchart of an example method of delaying a data signal.

FIG. 6 is a flowchart of an example method 600 of delaying a data signal, arranged in accordance with at least one embodiment described herein. The method 600 may be implemented, in some embodiments, by a data signal delay system, such as the systems 100, 200, 300, 400, or 500 of FIGS. 1A and 2-5, respectively. Although illustrated as discrete blocks, various blocks may be divided into additional blocks, combined into fewer blocks, or eliminated, depending on the desired implementation.

The method 600 may begin at block 602, where multiple delay signals may be generated by delaying a data signal by multiple delays. Each of the multiple delays may be different. In some embodiments, the difference between any two adjacent delays of the multiple delays, when the multiple delays are ordered from least to greatest, may be less than a minimum time between condition changes of the data signal. In some embodiments, a difference between each of the multiple delays may be a different amount of time, a varying amount of time, or a same amount of time. Alternately or additionally, the differences between two or more of the multiple delays may be a same amount of time.

In block 604, mixing weights may be set based on a final delay for a final delayed data signal.

In block 606, two of the multiple delay signals may be mixed based on the mixing weights to generate the final delayed data signal. The final delay of the final delayed data signal may be less than or equal to a first delay between the data signal and one of the two of the multiple delay signals and may be more than or equal to a second delay between the data signal and another of the two of the multiple delay signals.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 600 may further include selecting the two of the multiple delay signals to mix to generate the final delayed data signal based on the final delay of the final delayed data signal. In some embodiments, the mixing weights may be set based on the final delay and the delays of the two of the multiple delay signals selected for mixing. In some embodiments, the two of the multiple delay signals mixed to generate the final delay data signal may have delays that are adjacent when the multiple delays are ordered from least to greatest.

As another example, the method 600 may also include filtering the final delayed data signal using a low pass filter and amplifying the filtered final delayed data signal.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A data signal delay system comprising:
    a delay unit including a plurality of delay elements that each have an element delay, the delay unit configured to generate a plurality of delay signals by delaying a data signal using the plurality of delay elements such that each of the plurality of delay signals has a different delay; and
    a phase interpolation unit coupled to the delay unit and including a mixer, the mixer configured to mix two of the plurality of delay signals based on mixing weights selected for the two of the plurality of delay signals to generate a final delayed data signal that is the data signal delayed by a final delay, the mixing weights being selected based on the final delay.

2. The data signal delay system of claim 1, wherein the two of the delay signals mixed by the mixer are selected based on the final delay of the final delayed data signal such that the final delay of the final delayed data signal is less than or equal to a first delay between the data signal and one of the two of the plurality of delay signals and is more than or equal to a second delay between the data signal and another of the two of the plurality of delay signals.

3. The data signal delay system of claim 1, wherein a delay between the two of the plurality of delay signals mixed by the mixer is less than a minimum time between condition changes of the data signal.

4. The data signal delay system of claim 1, wherein the plurality of delay elements include N delay elements and the plurality of delay elements are arranged sequentially such that an output of each of the plurality of delay elements are one of the delay signals and an output of each of the plurality of delay elements except the Nth delay element is provided as an input to another of the plurality of delay elements.

5. The data signal delay system of claim 1, wherein the element delay of each of the plurality of delay elements is a different amount of time, a same amount of time, or a varying amount of time.

6. The data signal delay system of claim 1, wherein the element delay of each of the plurality of delay elements is less than a minimum time between condition changes of the data signal.

7. The data signal delay system of claim 1, wherein the mixing weights are selected based on the final delay and the delays of the delay signals mixed by the mixer.

8. The data signal delay system of claim 1, further comprising a low pass filter configured to low pass filter the plurality of delay signals before the plurality of delay signals are mixed by the mixer.

9. The data signal delay system of claim 1, further comprising an attenuator configured to reduce an amplitude of the plurality of delay signals before the plurality of delay signals are mixed by the mixer.

10. The data signal delay system of claim 1, wherein the phase interpolation unit includes a plurality of mixers that include the mixer, the plurality of mixers including one less mixer than a number of the plurality of delay signals, wherein each of the plurality of mixers is configured to mix two of the delay signals.

11. The data signal delay system of claim 1, wherein the plurality of delay signals include N delay signals and the mixer is configured to receive each of the N delay signals, the mixer being configured to mix each of the N delay signals with at least one other of the N delay signals and to mix N−2 of the delay signals with at least two other of the N delay signals.

12. The data signal delay system of claim 1, wherein at least one of the plurality of delay elements is a clocked latch.

13. The data signal delay system of claim 1, wherein the phase interpolation unit further comprises:
    a low pass filter configured to low pass filter the final delayed data signal; and
    a amplifier configured to amplify the filtered final delayed data signal.

14. A method of delaying a data signal, the method comprising:
    generating a plurality of delay signals by delaying a data signal by a plurality of delays, each of the plurality of delays being different;
    setting mixing weights based on a final delay for a final delayed data signal; and
    mixing two of the plurality of delay signals based on the mixing weights to generate the final delayed data signal, the final delay of the final delayed data signal being less than or equal to a first delay between the data signal and one of the two of the plurality of delay signals and being more than or equal to a second delay between the data signal and another of the two of the plurality of delay signals.

15. The method of claim 14, further comprising selecting the two of the plurality of delay signals to mix to generate the final delayed data signal based on the final delay of the final delayed data signal.

16. The method of claim 15, wherein the two of the plurality of delay signals mixed to generate the final delay data signal have delays that are adjacent when the plurality of delays are ordered from least to greatest.

17. The method of claim 15, wherein the mixing weights are set based on the final delay and the delays of the two of the plurality of delay signals selected for mixing.

18. The method of claim 14, wherein a difference between each of the plurality of delays of the plurality of delay signals is a different amount of time, a same amount of time, or a varying amount of time.

19. The method of claim 14, wherein a difference between any two adjacent delays of the plurality of delays when the plurality of delays are ordered from least to greatest is less than a minimum time between condition changes of the data signal.

20. The method of claim 14, further comprising:
    filtering the final delayed data signal using a low pass filter; and
    amplifying the filtered final delayed data signal.

* * * * *